United States Patent
Hwang

(10) Patent No.: US 12,486,172 B2
(45) Date of Patent: Dec. 2, 2025

(54) METHOD FOR CONTINUOUS PRODUCTION OF CARBON NANOTUBES

(71) Applicant: KORBON CO., LTD., Gangneung-si (KR)

(72) Inventor: Hee Chung Hwang, Gangneung-si (KR)

(73) Assignee: KORBON CO., LTD., Gangneung-si (KR)

( * ) Notice: Subject to any disclaimer, the term of this patent is extended or adjusted under 35 U.S.C. 154(b) by 455 days.

(21) Appl. No.: 18/250,700

(22) PCT Filed: Oct. 14, 2021

(86) PCT No.: PCT/KR2021/014227
§ 371 (c)(1),
(2) Date: Apr. 26, 2023

(87) PCT Pub. No.: WO2022/097948
PCT Pub. Date: May 12, 2022

(65) Prior Publication Data
US 2023/0406707 A1    Dec. 21, 2023

(30) Foreign Application Priority Data

Nov. 9, 2020 (KR) .......................... 10-2020-0148692

(51) Int. Cl.
*C01B 32/164* (2017.01)
(52) U.S. Cl.
CPC ................................ *C01B 32/164* (2017.08)
(58) Field of Classification Search
CPC . C01B 32/164; C01B 2202/36; C01B 32/162; C01B 32/158; C01B 32/159; C01B 32/16; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| 10,793,795 | B1 | 10/2020 | Shenderova et al. |
| 2014/0093790 | A1 | 4/2014 | Liu et al. |

FOREIGN PATENT DOCUMENTS

| CN | 1535246 | A | 10/2004 |
| EP | 3037161 | A1 | 6/2016 |
| IT | 20120454 | A1 | 3/2014 |
| JP | H11-109878 | A | 4/1999 |
| JP | 2004-534715 | A | 11/2004 |
| JP | 5942854 | B2 | 6/2016 |
| KR | 10-2003-0008763 | A | 1/2003 |
| KR | 10-0432056 | B1 | 5/2004 |
| KR | 10-2005-0052885 | A | 6/2005 |
| KR | 10-2008-0006813 | A | 1/2008 |
| KR | 10-2017-0123633 | A | 11/2017 |
| KR | 10-2230238 | B1 | 3/2021 |

OTHER PUBLICATIONS

Written Opinion of the International Searching Authority in PCT/KR2021/014227 dated Jan. 25, 2022 (Year: 2022).*
An Office Action mailed by China National Intellectual Property Administration on Aug. 13, 2024, which corresponds to Chinese Patent Application No. 202180074547.4 and is related to U.S. Appl. No. 18/250,700.
An Office Action; "Notice of Reasons for Refusal," mailed by the Japanese Patent Office on May 7, 2024, which corresponds to Japanese Patent Application No. 2023-527714 and is related to U.S. Appl. No. 18/250,700.
International Search Report issued in PCT/KR2021/014227; mailed Jan. 25, 2022.

* cited by examiner

Primary Examiner — Daniel C. Mccracken
(74) Attorney, Agent, or Firm — Studebaker Brackett PLLC

(57) ABSTRACT

The present disclosure relates to a method for the continuous production of carbon nanotubes, the method comprising: a mixture preparing step for mixing and stirring a solvent, a metal salt, a surfactant, a reducing agent, and a function improving agent to prepare an emulsion mixture; a gaseous mixture forming step for mixing the emulsion mixture with a carrier gas to form a gas phase mixture; and a reacting step for introducing the gas phase mixture into a heated reactor to form carbon nanotubes, wherein the diameter of the carbon nanotubes can be uniformly controlled, and the production yield of the carbon nanotubes can be increased.

6 Claims, No Drawings

METHOD FOR CONTINUOUS PRODUCTION OF CARBON NANOTUBES

CROSS-REFERENCE TO RELATED APPLICATIONS

This application is a U.S. National Phase Entry of International Application No. PCT/KR2021/014227 filed on Oct. 14, 2021, which claims the benefit of priority to Korean Patent Application No. 10-2020-0148692 filed on Nov. 9, 2020, the entire content of which is incorporated herein by reference.

TECHNICAL FIELD

The present disclosure relates to a continuous carbon nanotube manufacturing method using a gas phase synthesis method. More particularly, the present disclosure relates to a continuous carbon nanotube manufacturing method of continuously manufacturing carbon nanotubes by preparing uniformly sized catalytic metal nanoparticles and reacting them with a carbon source in a gas phase.

BACKGROUND ART

Thermoplastics, especially high-performance plastics with excellent mechanical properties and heat resistance, are used in a variety of applications. Depending on the field of application, these high-performance plastics require antistatic properties such as antistatic, dust prevention, etc., to prevent malfunctions and contamination of parts, so electrical conductivity is required in addition to the existing properties.

Surfactants, metal powders, metal fibers, etc., have been added to high-performance plastics to give them this electrical conductivity in the past, but these components have problems such as low conductivity and weakened mechanical strength, so there is a growing interest in carbon materials with electrical conductivity.

As a carbon material with electrical conductivity, conductive carbon black is commonly used, but in order to achieve high electrical conductivity using conductive carbon black, a large amount of carbon black needs to be added, and the structure of the carbon black may decompose during the melt mixing process. As a result, the processability of the resin may deteriorate, and the thermal stability and physical properties may be significantly reduced, so research on carbon nanotube-resin composites with carbon nanotubes added instead of conductive carbon black to improve electrical conductivity while reducing the amount of conductive filler is actively being conducted.

Carbon nanotubes, discovered in Japan in 1991, are a material in which three neighboring carbon atoms are bonded to one carbon atom, and the bonds between these carbon atoms form a hexagonal ring, which curls into a cylindrical tube with a honeycomb-like repeating plane.

Carbon nanotubes are divided into a single-walled carbon nanotube (SW carbon nanotube) composed of a single layer and a diameter of about 1 nm, a double-walled carbon nanotube (DW carbon nanotube) composed of two or more layers, and a multi-walled carbon nanotube (MW carbon nanotube) composed of three or more layers and have a diameter of about 5 to 100 nm.

These carbon nanotubes can be synthesized by a variety of methods, including arc discharge, laser evaporation, thermal chemical vapor deposition (CVD), catalytic synthesis, and plasma synthesis, which synthesize carbon nanotubes at high temperatures ranging from hundreds to thousands of degrees, or under vacuum.

However, conventional methods have difficulties in forming uniformly sized catalysts, difficulties in controlling the diameter of the resulting carbon nanotubes uniformly, and problems in reducing the yield of carbon nanotubes due to the generation of by-products such as carbon black, so a new method for manufacturing carbon nanotubes that can solve these problems is required.

DISCLOSURE

Technical Problem

In the present disclosure of the continuous carbon nanotubes producing method using a vapor phase synthesis method, an objective is to provide a carbon nanotube production method that enable to control the diameter of the carbon nanotube uniformly and to increase carbon nanotube production yield.

Technical Solution

An embodiment of the present disclosure for achieving the above-mentioned objectives includes: a liquid mixture forming step, in which a solvent, a metal salt, a surfactant, a reducing agent, and a functional enhancer are mixed and stirred to prepare an emulsion mixture; a gas phase mixture forming step, in which the emulsion mixture is mixed with a carrier gas to prepare a ga phase mixture; and a reacting step of introducing the vapor phase mixture into a heated reactor to form carbon nanotubes.

In the vapor phase mixture forming step, a carbon source may be further mixed.

The liquid mixture forming step may include: a first mixing step of mixing and stirring a solvent, a metal salt, and a surfactant; and a second mixing step of adding a reducing agent and a functional enhancer to the mixture obtained through the first mixing step and stirring.

The solvent may be at least one selected from the group consisting of aromatic hydrocarbons, aliphatic hydrocarbons, alcohol compounds, and water.

The emulsion mixture may include 001 to 5 parts by weight of a metal salt, 5 to 17 parts by weight of a surfactant, 002 to 10 parts by weight of a reducing agent, and 01 to 04 parts by weight of a functional enhancer, based on 100 parts by weight of a solvent.

The functional enhancer may include at least one or more indole, imidazole, and hectorite compounds.

The functional enhancer may be a mixture of at least one first compound selected from the group consisting of indole and imidazole and a second compound including a hectorite compound.

Advantageous Effects

The continuous carbon nanotubes producing method of the present disclosure has the effect of uniformly controlling the diameter of carbon nanotubes and increasing the yield of carbon nanotubes.

MODE FOR INVENTION

Hereinafter, before being described in detail through a preferred embodiment of the present disclosure, it will be noted that terms or words used in the present specification and claims should not be limited to general or dictionary meanings but should be interpreted as meanings and concepts conforming to the technical idea of the present Throughout this specification, when a part "includes" a certain component, it means that other components may be further included rather than excluding other components unless otherwise stated.

Throughout this specification, the "%" used to indicate the concentration of a particular substance means (weight/weight) % for solid/solid, (weight/volume) % for solid/liquid, and (volume/volume) % for liquid/liquid, unless otherwise stated.

In general, a colloid is anything with particle size less than 045 μm (or 02 μm) and greater than 1000 Da (Dalton, the weight of one molecule), but in the specification of the present disclosure, the term "colloid" is used to mean a solution containing particles with particle sizes ranging from a few to several hundred nanometers, and sometimes even precursors thereof.

Hereinafter, an embodiment of the present disclosure will be described. However, the scope of the present disclosure is not limited to the following preferred embodiments, and those skilled in the art can implement various modified forms of the contents described herein within the scope of the present disclosure.

First, the present disclosure relates to a continuous carbon nanotubes producing method, the method including: a mixture preparing step, in which a solvent, a metal salt, a surfactant, a reducing agent, and a functional enhancer are mixed and stirred to prepare an emulsion mixture; a gas phase mixture forming step, in which the emulsion mixture is mixed with a carrier gas to form a gas phase mixture; and a reacting step, in which the gas phase mixture is introduced into a heated reactor to form carbon nanotubes.

The mixture preparing step is a step of preparing an emulsion mixture, which is a precursor material for forming carbon nanotubes, by mixing a solvent, a metal salt, a surfactant, a reducing agent, and a functional enhancer.

The metal salts included in the emulsion mixture function as a catalyst to form carbon nanotubes, and through the mixture preparing step, the metal is formed into fine particles with a particle size of 300 nm or less, and the properties and performance of the particles are different than when the particle size is larger. In particular, the surface area per unit mass is remarkably increased, the function is improved, and physical property changes, such as a decrease in the melting point of the particles and a change in color appear.

In addition, nanometer-sized fine metal particles have high reactivity and can exist in a suspended state in a gas phase, and thus can be used as a catalyst for synthesizing carbon nanotubes in a gas phase. Through the mixture preparing step, the particle size of these metals is formed to a nanometer size and can be uniformly dispersed in the solvent.

More specifically, the mixture preparing step is preparing an emulsion mixture including 0.01 to 5 parts by weight of a metal salt, 5 to 17 parts by weight of a surfactant, 0.02 to 10 parts by weight of a reducing agent, and 0.1 to 0.4 parts by weight of a functional enhancer, relative to 100 parts by weight of a solvent.

The solvent functions as a medium for uniformly dispersing the metal salt and, at the same time, provides a carbon source required for synthesizing carbon nanotubes as needed.

As the solvent, at least one selected from the group consisting of aromatic hydrocarbons, aliphatic hydrocarbons, alcohol compounds, and water may be used. Benzene, toluene, xylene, etc., may be used as aromatic hydrocarbons, hexane, heptane, octane, etc., may be used as an aliphatic hydrocarbon, and ethanol, propyl alcohol, polyethylene glycol, etc., may be used as an alcohol compound, but is not limited thereto.

The metal salts are intended to function as catalysts in the carbon nanotube synthesis reaction as described above, in which any one or more of metal salts such as the oxides, nitrides, borides, fluorides, bromides, sulfides, chlorides, and carbonate salts of one or more metals selected from the group consisting of iron (Fe), cobalt (Co), nickel (Ni), platinum (Pt), palladium (Pd), molybdenum (Mo), and vanadium (V) may be used as such metal salts.

The metal salt may be included in an amount of 0.01 to 5 parts by weight based on 100 parts by weight of the solvent, and when the content of the metal salt is less than 0.01 parts by weight, the amount of catalyst required for the synthesis of carbon nanotubes is insufficient, resulting in a decrease in the efficiency of the synthesis of carbon nanotubes, and when the content of the metal salt exceeds 5 parts by weight, no additional carbon nanotubes are obtained even if the process parameters are changed, but rather a large amount of unreacted catalyst is generated, resulting in a decrease in the purity of the carbon nanotubes, so the content of the metal salt is preferably included within the weight range described above.

The surfactant is added to form the metal salt or metal into nanometer-sized fine particles to maintain the fine particle state of the metal salt or metal until reacted with the carbon source to form carbon nanotubes and to disperse the fine metal particles uniformly and stably in the solvent.

As the surfactant, at least any one of nonionic surfactants, anionic surfactants, cationic surfactants, and amphoteric surfactants may be used.

For example, as the nonionic surfactant, polyoxyethylene, alkyl glucoside, alkyl polyglucoside, polyhydroxy fatty acid amide, alkoxylated fatty acid ester, sucrose ester, amine oxide, alcohol ethoxylate, amide ethoxylates, amine oxides, and alkyl glucosides may be used, and examples thereof include cocamide methyl, C8-C14 glucose amide, C8-C14 alkyl polyglucoside, sucrose cocoate, sucrose laurate, lauramine oxide, cocoamine oxide, and the like may be used, but are not limited thereto.

For example, as the anionic surfactant, alkyl sulfate-based, ethoxylated alkyl sulfate-based, alkyl ethoxy carboxylate-based, alkyl glyceryl ether sulfonate-based, ethoxyether sulfonate-based, methyl acyl taurate-based, alkyl sulfo succinate-based, alkylethoxy sulfosuccinate-based, alpha-sulfonated fatty acid-based, alkylphosphate ester-based, ethoxylated alkylphosphate ester-based, straight-chain alkylbenzene sulfonate-based, paraffin sulfonate-based, alpha-olefin sulfonate-based, alkylalkoxy sulfate-based, and the like may be used, and examples thereof include sodium lauryl sulfate, sodium laureth sulfate, sodium coco sulfate, and the like may be used, but are not limited thereto.

For example, as the cationic surfactant, at least one selected from the group consisting of cetyl trimethylammonium bromide, decyl trimethylammonium bromide, dodecyl trimethylammonium bromide, didecyl dimethylammonium bromide, cetyl dimethyl ammonium chloride, lauryl dimethyl ammonium chloride, stearyl dimethyl ammonium chloride, tallow dimethyl ammonium chloride, ditallow dimethyl ammonium methyl sulfate, coconut ammonium chloride, stearamyropropyl PG-dimonium chloride phosphate, and stearamidopropyl ethyl dimonium ethosulfate may be used, but are not limited thereto.

For example, as the amphoteric surfactant, alkylbethane-based, amidebethane-based, sulfobethane-based, hydroxysulfobethane-based, amidosulfobethane-based, phosphobethane-based, imidazoliniumbethane-based, aminopropionic acid-based, and amino acid-based surfactants may be used, but are not limited thereto.

The surfactant may be used in an amount of 5 to 17 parts by weight based on 100 parts by weight of the solvent, and when the content of the surfactant is less than 5 parts by weight, the fine particulate of the metal salt is not sufficiently achieved, and the fine particulate metal salt is not uniformly distributed in the solvent and agglomerates with each other, making it difficult to synthesize carbon nanotubes of uniform size. On the other hand, when the content of the surfactant exceeds 17 parts by weight, the effect of nanoparticulation of additional metal salts, improvement of dispersibility, etc., is not obtained, but rather, there is a problem that the function of the metal salt as a catalyst is reduced by excessive surfactant, resulting in a decrease in the yield of carbon nanotube synthesis, so it is preferably included within the weight range described above.

The reducing agent is added to reduce the metal salt and form the metal salt into metal particles having a uniform size, and may be included in an amount of 0.02 to 10 parts by weight based on 100 parts by weight of the solvent. The reducing agent is preferably included within the above-mentioned weight range because when the content of the reducing agent is less than 0.02 parts by weight, the metal salt is not sufficiently reduced, and the properties of the synthesized carbon nanotubes become uneven, and when the content of the reducing agent exceeds 10 parts by weight, the properties of the emulsion mixture are reduced due to excessive reducing agent and the productivity of the carbon nanotube synthesis is reduced accordingly.

As the reducing agent, inorganic compounds such as hydrazine, $LiBH_4$, and $NaBH_4$ and compounds containing reducing functional groups such as ethylene oxide may be used but are not limited thereto.

The functional enhancer is a component added to increase the phase stability of the colloidal solution, such as forming the size of the metal particles uniformly and stably and preventing agglomeration between the metal particles while increasing the yield of the carbon nanotubes by the metal, and the functional enhancer may include at least one or more of indole, imidazole, and hectorite compounds.

The functional enhancer may be included in an amount of 0.1 to 0.4 parts by weight based on 100 parts by weight of the solvent. When the content of the functional enhancer is less than 0.1 parts by weight, it is difficult to achieve the above-described effect, and when the content of the functional enhancer exceeds 0.4 parts by weight, the stability of the colloidal solution is deteriorated, resulting in a decrease in the process efficiency and synthesis efficiency during subsequent carbon nanotube synthesis, so it is preferably included within the weight range described above.

The such functional enhancers may include at least one of indole, imidazole, and hectorite compounds, in which the hectorite compounds may include 2-hydrogenated tallow benzylmonium hectorite, disteardimonium hectorite, quaternium-18 hectorite, or stearalkonium hectorite.

Preferably, at least one first compound selected from the group consisting of indole and imidazole and a second compound that is a hectorite compound may be used together.

When only the first compound is used, the effect of improving the yield of carbon nanotubes by metal catalysis can be achieved, but there is a problem that the phase stability of the colloidal solution is reduced by the first compound, and metal atoms agglomerate with each other during the reduction of metal ions to metal atoms to form metal agglomerates. These agglomerates make the resulting carbon nanotubes uneven in diameter, which hinders the synthesis of uniform and constant diameter carbon nanotubes.

However, when the first compound and the second compound are used together, it is preferable to use the first compound and the second compound together because the second compound plays a stabilizing role by physically inhibiting the agglomeration of the reduced metal particles during the reduction process.

In this case, the first compound and the second compound may be mixed and used in a weight ratio of 1:0.3 to 0.7. When the weight ratio of the second compound to the first compound is less than 0.3 by weight, it is difficult to obtain the effect of improving the yield of carbon nanotubes by the metal catalyst, and when the weight ratio of the second compound to the first compound is more than 0.7 by weight, there is a problem that the phase stability of the colloidal solution is reduced, resulting in a decrease in the process efficiency and synthesis efficiency, so it is preferable to mix and use within the weight range described above.

Meanwhile, the mixture preparing step may include: a first mixing step of mixing and stirring a solvent, a metal salt, and a surfactant; and a second mixing step of adding a reducing agent and a functional enhancer to the mixture obtained through the first mixing step and stirring.

Specifically, the first mixing step is a step of mixing a metal salt after mixing a surfactant with a solvent, and the metal salt may be dispersed in the solvent while forming micelles or reverse micelles by the surfactant. At this time, when the surfactant and the metal salt are simultaneously added to the solvent and mixed, the solubilization of the metal salt is not completely and uniformly performed. Therefore, it is preferable to first mix the solvent and the surfactant and then add the metal salt for uniform solubilization of the metal salt.

In addition, when this mixing step is performed at room temperature, the phase of the mixture becomes unstable, and phase separation occurs, so the mixing in the first mixing step is preferably performed at a temperature in a range of 40° C. to 70° C. In order to form a more stable phase, it is preferable to add a surfactant to the solvent, raise the temperature, and add the metal salt while maintaining the above temperature range.

Since agglomeration of the metal salt may occur due to solvent volatilization when the temperature is higher than the above temperature, it is preferable that the temperature increase is limited within the above-mentioned temperature range. At this time, after adding the metal salt, mixing may be performed for 4 to 8 hours.

The mixture obtained through the first mixing step in this way is preferably prepared by being cooled to 10° C. to 30° C. for a stable reaction thereafter. When the second mixing step is performed by keeping the temperature of the mixture high without going through a cooling step, abnormal growth of metals and subsequent settling of metal particles will occur, so the mixture obtained after the first mixing step is preferably cooled and prepared before entering the second mixing step.

At this time, in the first mixing step, ultrasonic dispersion in water may be performed to form a metal salt of a more uniform and constant size. Ultrasonic dispersion can be performed by applying ultrasonic waves with a power of 30 to 45 W to the cooled mixture for 10 to 20 minutes, and when the irradiation power is outside the above range, the dispersion efficiency may be reduced, or even uneven formation of metal salt size may occur.

Next, the second mixing step is a step of adding the reducing agent and the functional enhancer to the mixture obtained by the first mixing step and stirring so as to obtain the effect of reduction by the reducing agent and performance enhancement by the functional enhancer and stirring may be performed for 10 to 24 hours after mixing each component.

In this way, when the mixture preparation step is performed in two steps, the metal salts are uniformly dispersed in the solvent in a nanoscale particle state through the first mixing step and subsequently reduced through the second mixing step, and the catalytic performance enhancement effect of the functional enhancer is uniformly imparted to the individual metal particles, so that the metal microparticles can be dispersed more uniformly and stably, and the functional enhancement effect of the functional enhancer can be more effectively achieved compared to the case of preparing an emulsion mixture by mixing each of these components simultaneously.

Therefore, as described above, the dispersion and reduction of metal salts are performed in separate steps, and the addition of functional enhancers in the reducing step is effective in improving the uniformity and yield of the synthesized carbon nanotubes.

Next, a gas phase mixture forming step of forming a gas phase mixture by mixing the emulsion mixture with a carrier gas is performed.

As described above, since the size of the metal particles dispersed in the emulsion mixture of the present disclosure is as small as nanometers, it can be formed in the gas phase by itself or mixed with other gases.

Specifically, the emulsion mixture may be mixed with a carrier gas to form a gas phase through spraying or atomization, and the gas phase mixture formed in the gas phase is supplied to a reactor and used for synthesizing carbon nanotubes. At this time, as the carrier gas, an inert gas such as argon, neon, helium, or nitrogen, or a hydrocarbon gas may be used, and preferably, a specialized gas such as hydrogen or hydrogen sulfide may be supplied together, but are not limited thereto.

In this step, the spray flow rate of the emulsion mixture is preferably between 0.10 and 0.85 ml/min, and the flow rate of the carrier gas is preferably between 30 and 450 sccm, and when their supply flow rate is outside the above range, it is difficult to achieve uniform dispersion and diffusion of the metal fine particles in the gas phase, which may cause problems such as a decrease in the synthesis yield of the carbon nanotubes, an increase in the amount of unreacted catalyst, or a decrease in the economy and process efficiency due to excessive use of the carrier gas.

Meanwhile, in addition to the emulsion mixture and the carrier gas, a carbon source gas may be supplied at this step, and the supply flow rate of the carbon source gas is preferably 20 to 200 sccm to achieve effects such as improving the carbon nanotube yield, minimizing unreacted materials, and improving economy and productivity.

In particular, when water is used as a solvent and hydrocarbon gas is not used as a carbon source, a carbon source gas must be supplied together in the gas phase mixture forming step to form carbon nanotubes, and when a carbon-containing solvent such as aromatic hydrocarbons, an aliphatic hydrocarbon, or an alcohol compound is used as a solvent, a carbon source gas may or may not be additionally supplied in this step.

In this way, when the carbon source gas is supplied together in the gas phase mixture forming step, the carbon source gas may include an organic compound selected from the group consisting of carbon monoxide, saturated or unsaturated aliphatic hydrocarbons having 1 to 6 carbon atoms, or aromatic hydrocarbons having 6 to 10 carbon atoms. Such carbon source gases may also include 1 to 3 heteroatoms selected from the group consisting of oxygen, nitrogen, chlorine, fluorine, and sulfur.

According to one preferred embodiment of the present disclosure, specialized gases such as $H_2$, $H_2S$, and $NH_3$ gases may be supplied together with the carbon source gas.

Next, a reacting step of obtaining carbon nanotubes by reacting the gas phase mixture formed in the gas phase mixture forming step is performed.

In this step, the gas phase mixture is introduced into a heated reactor to form carbon nanotubes, and since the catalyst particles were formed into uniformly sized nano-microparticles in the previous step and dispersed into a stable and uniform gas phase, it is possible to synthesize carbon nanotubes continuously under milder reaction conditions compared to general carbon nanotube gas phase synthesis reactions.

The temperature of the reactor for synthesizing carbon nanotubes in this step may be 600° C. to 1500° C., and when the temperature is outside this range, there is a problem of decreasing the selectivity of carbon nanotubes and decreasing the yield of carbon nanotubes due to an increase in unreacted reactants, so it is preferable that the synthesis reaction is performed in the temperature range described above.

Hereinafter, specific actions and effects of the present disclosure will be described through an embodiment of the present disclosure. However, this is presented as a preferred example of the present disclosure, and the scope of the present disclosure is not limited according to the embodiments.

Preparation Example

First, 100 parts by weight of benzene, a solvent, were mixed with 8 parts by weight of cetyltrimethylammonium bromide, heated to 45° C., and then 0.7 parts by weight of metal salt ($FeCl_3$) were added and mixed for 6 hours, and ultrasonic waves of 40 W were applied for 15 minutes during mixing. Afterward, the mixture was cooled to 27° C.

Next, 1.5 parts by weight of $LiBH_4$ as a reducing agent and 0.19 parts by weight of a function enhancer were mixed with the above mixture based on 100 parts by weight of the solvent and stirred for 8 hours to prepare an emulsion mixture. At this time, a mixture of indole and disteardimonium hectorite at a weight ratio of 1:0.5 was used as the functional enhancer.

Next, the emulsion mixture was introduced into a reaction furnace heated to 1200° C. at a rate of 0.40 ml/min, and at the same time, argon (Ar), a carrier gas, was supplied at a flow rate of 100 sccm, and the reaction proceeded for a total of 20 minutes to synthesize carbon nanotubes.

Experimental Example 1

Emulsion mixtures were prepared by varying the content of the functional enhancer as shown in Table 1 below, and carbon nanotubes were synthesized using each emulsion mixture using the same method as in the Example, and the synthesis yield and diameter distribution of the carbon nanotubes were measured, and the results are shown in Table 1. The synthesis yield was calculated according to Formula (1) below, and the diameter distribution was obtained by taking scanning electron microscope (SEM) and transmission electron microscope (TEM) photographs of each synthesized carbon nanotube and measuring the diameters of random strands, including the thinnest and thickest, of the carbon nanotube strands in the photographs, and calculating their mean values and standard deviations, which are listed in Table 1. At this time, the content of the functional enhancer in Table 1 means the weight based on 100 parts by weight of benzene.

Synthesis yield (%)=[amount of produced carbon nanotubes (g)/amount of supplied metal salt (g)]×100     (1)

TABLE 1

|  | Functional enhancer (parts by weight) | Synthesis yield (%) | Diameter distribution | |
|---|---|---|---|---|
|  |  |  | Average value (nm) | Standard deviation |
| Comparative Example 1 | — | 85.8 | 2.9 | 1.08 |
| Comparative Example 2 | 0.07 | 94.3 | 2.5 | 0.85 |
| Example 1 | 0.11 | 174.3 | 2.0 | 0.27 |
| Example 2 | 0.19 | 185.6 | 1.8 | 0.25 |
| Example 3 | 0.28 | 204.9 | 2.3 | 0.21 |
| Example 4 | 0.38 | 221.9 | 1.9 | 0.22 |
| Comparative Example 3 | 0.42 | 125.6 | 3.1 | 1.22 |

When looking at the experimental results in Table 1, the synthesis yield was significantly higher in the case of Examples 1 to 4 compared to Comparative Examples 1 to 3, and the standard deviation value of the diameter of the obtained carbon nanotubes was less than 0.3, indicating that the diameter of the carbon nanotubes in each strand was uniformly formed.

Specifically, when looking at Comparative Example 1 and Comparative Example 2 together, it can be seen that when the content of the functional enhancer is insufficient, the synthesis yield enhancement and diameter distribution equalization effect by the functional enhancer is not shown. Furthermore, in the case of Comparative Example 3, there is no effect of the functional enhancer, which is believed to be a result of the excessive content of the functional enhancer causing phase destabilization of the emulsion mixture.

Therefore, from the results of this experiment, it was confirmed that the content of the function enhancer for improving the carbon nanotube synthesis yield and uniformizing the diameter was 0.1 to 0.4 parts by weight based on 100 parts by weight of the solvent.

Experimental Example 2

Emulsion mixtures were prepared using the same method as in the previous Example, but with the content of indole (I) and disteardimonium hectorite (D) used as functional enhancers varied as shown in Table 2 below, and carbon nanotubes were synthesized using each emulsion mixture in the same manner as in the previous Example. Then, the synthetic yield and diameter distribution were measured using the same method as in Example 1, and the results are shown in Table 2.

TABLE 2

|  | Functional enhancer (parts by weight) | | | | Diameter distribution | | |
|---|---|---|---|---|---|---|---|
|  | Indole (A) | Distear Dimonium hectorite (B) | Total | A:B | Synthetic yield (%) | Average value (nm) | Standard Deviation |
| Example 5 | 0.21 | — | 0.21 | — | 233 | 2.8 | 1.45 |
| Example 6 | — | 0.20 | 0.20 | — | 91 | 1.9 | 0.41 |
| Example 7 | 0.15 | 0.04 | 0.19 | 1:0.27 | 214 | 2.2 | 1.02 |
| Example 8 | 0.14 | 0.05 | 0.19 | 1:0.36 | 222 | 2.0 | 0.20 |
| Example 9 | 0.12 | 0.07 | 0.19 | 1:0.58 | 232 | 2.1 | 0.28 |
| Example 10 | 0.12 | 0.08 | 0.20 | 1:0.67 | 216 | 1.8 | 0.28 |
| Example 11 | 0.12 | 0.09 | 0.21 | 1:0.75 | 125 | 2.5 | 0.21 |

When looking at the experimental results of Table 2, in the case of Example 5, the synthesis yield is high, but there is a problem of uneven diameter formation of carbon nanotubes, and in the case of Example 6, the synthesis yield is reduced, so it can be confirmed that it is preferable to use indole and disteardimonium hectorite together as a functional enhancer.

In addition, Example 7 showed similar results to Example 5 despite the inclusion of both indole and disteardimonium hectorite, and Example 11 showed similar results to Example 6. From these results, it was confirmed that when both indole and disteardimonium hectorite are used as the functional enhancer, it is preferable to use them in a weight ratio of 1:0.3 to 0.7.

The present disclosure is not limited to the specific embodiments and descriptions described above, and without departing from the gist of the present disclosure claimed in the claims, anyone with ordinary skilled in the art to which the disclosure pertains can make various modifications implementation is possible, and such modifications shall fall within the protection scope of the present disclosure.

INDUSTRIAL APPLICABILITY

The method of manufacturing carbon nanotubes continuously using the gas phase synthesis method according to the present invention has the effect of uniformly controlling the diameter and increasing the yield of carbon nanotubes, and therefore has the potential for industrial use.

The invention claimed is:
1. A method for continuous production of carbon nanotubes, the method comprising:
   a liquid mixture forming step of mixing and stirring a solvent, a metal salt, a surfactant, a reducing agent, and a functional enhancer to prepare an emulsion mixture,
   a gas phase mixture forming step of mixing the emulsion mixture with a carrier gas to form a gas phase mixture; and
   a reacting step of introducing the gas phase mixture into a heated reactor to form carbon nanotubes,
   wherein the functional enhancer comprises at least one indole, imidazole, and hectorite compounds.

2. The method of claim 1, wherein in the gas phase mixture forming step, a carbon source is additionally mixed.

3. The method of claim 1, wherein the liquid mixture forming step comprises:
- a first mixing step of mixing and stirring the solvent, the metal salt, and the surfactant; and
- a second mixing step of adding the reducing agent and the functional enhancer to the mixture obtained through the first mixing step.

4. The method of claim 1, wherein the solvent is at least one selected from the group consisting of aromatic hydrocarbons, aliphatic hydrocarbons, alcohol compounds, and water.

5. The method of claim 1, wherein the emulsion mixture comprises 0.01 to 5 parts by weight of the metal salt, 5 to 17 parts by weight of the surfactant, 0.02 to 10 parts by weight of the reducing agent, and 0.1 to 0.4 parts by weight of the functional enhancer based on 100 parts by weight of solvent.

6. The method of claim 1, wherein the functional enhancer is a mixture of a first compound selected from the group consisting of indole and imidazole and a second compound comprising a hectorite compound.

\* \* \* \* \*